(12) United States Patent
Kim et al.

(10) Patent No.: US 9,683,547 B2
(45) Date of Patent: Jun. 20, 2017

(54) WIND TURBINE HAVING NACELLE FENCE

(71) Applicant: Korea Aerospace Research Institute, Daejeon (KR)

(72) Inventors: Cheolwan Kim, Seoul (KR); Taehwan Cho, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 383 days.

(21) Appl. No.: 14/368,004

(22) PCT Filed: Dec. 21, 2012

(86) PCT No.: PCT/KR2012/011248
§ 371 (c)(1),
(2) Date: Jun. 23, 2014

(87) PCT Pub. No.: WO2013/095033
PCT Pub. Date: Jun. 27, 2013

(65) Prior Publication Data
US 2015/0003993 A1  Jan. 1, 2015

(30) Foreign Application Priority Data

Dec. 23, 2011 (KR) .................. 10-2011-0140703

(51) Int. Cl.
| F03D 1/04 | (2006.01) |
| F03D 80/00 | (2016.01) |
| F03D 15/00 | (2016.01) |

(52) U.S. Cl.
CPC .............. *F03D 1/04* (2013.01); *F03D 15/00* (2016.05); *F03D 80/00* (2016.05);
(Continued)

(58) Field of Classification Search
CPC ............ F03D 1/04; F03D 11/02; F03D 3/002
(Continued)

(56) References Cited

U.S. PATENT DOCUMENTS

| 7,214,029 B2 | 5/2007 | Richter |
| 2006/0113804 A1* | 6/2006 | Costin ................. F03D 9/002 290/55 |

(Continued)

FOREIGN PATENT DOCUMENTS

| KR | 200244751 | 8/2001 |
| KR | 1020050090295 | 9/2005 |
| KR | 1020100096575 | 9/2010 |

OTHER PUBLICATIONS

Kim (20-0244751), (Sep. 25, 2001) English Translation.*
International Search Report—PCT/KR2012/011248 dated Apr. 3, 2013.

*Primary Examiner* — Dwayne J White
*Assistant Examiner* — Su Htay
(74) *Attorney, Agent, or Firm* — Cantor Colburn LLP (57) ABSTRACT

Provided is a wind turbine for generating electric energy using wind power, and more specifically, a wind turbine having a nacelle fence for improving aerodynamic performance by mounting a fence structure on the nacelle of a horizontal axis wind turbine. The wind turbine having a nacelle fence decreases the vortex that is generated at the downstream ends of rotating blades so as to improve the aerodynamic performance of the blades, and increases the power coefficient of the wind turbine.

4 Claims, 7 Drawing Sheets

(52) U.S. Cl.
CPC ....... *F05B 2240/14* (2013.01); *F05B 2260/97* (2013.01); *Y02E 10/72* (2013.01)

(58) Field of Classification Search
USPC ...................................... 415/4.5, 193, 208.1
See application file for complete search history.

(56) References Cited

U.S. PATENT DOCUMENTS

| | | | |
|---|---|---|---|
| 2007/0013196 A1* | 1/2007 | Chen .................... | F03D 1/04 290/55 |
| 2010/0301612 A1* | 12/2010 | Lee ...................... | F03D 1/06 290/55 |
| 2011/0006536 A1* | 1/2011 | Liu ...................... | F03D 7/0204 290/55 |
| 2011/0008164 A1* | 1/2011 | Presz, Jr. ............. | F03D 1/04 415/211.2 |
| 2011/0037268 A1* | 2/2011 | Sammy ................. | F03D 1/025 290/55 |
| 2012/0128475 A1* | 5/2012 | Bailey .................. | F03D 1/04 415/182.1 |

* cited by examiner

FIG. 1

*Prior Art*

FIG. 2

*Prior Art*

WIND TURBINE HAVING NACELLE FENCE

TECHNICAL FIELD

The present invention relates to a wind turbine for generating electric energy using wind power, and more particularly, to a wind turbine having a nacelle fence for improving aerodynamic performance by mounting a fence structure on a nacelle of a horizontal axis wind turbine.

BACKGROUND ART

With the depletion of natural resources such as petroleum, coal, and natural gas due to industrial development and population growth, many studies on a wind turbine for generating electric energy using wind power have been conducted as an alternative energy source.

Wind power generation, which is a technology of converting kinetic energy of air flow into mechanical energy and then generating electric energy, uses wind existing in nature as an energy source and therefore is environmentally-friendly without expense, and as a result the usage thereof has been gradually increased.

Figure 1:
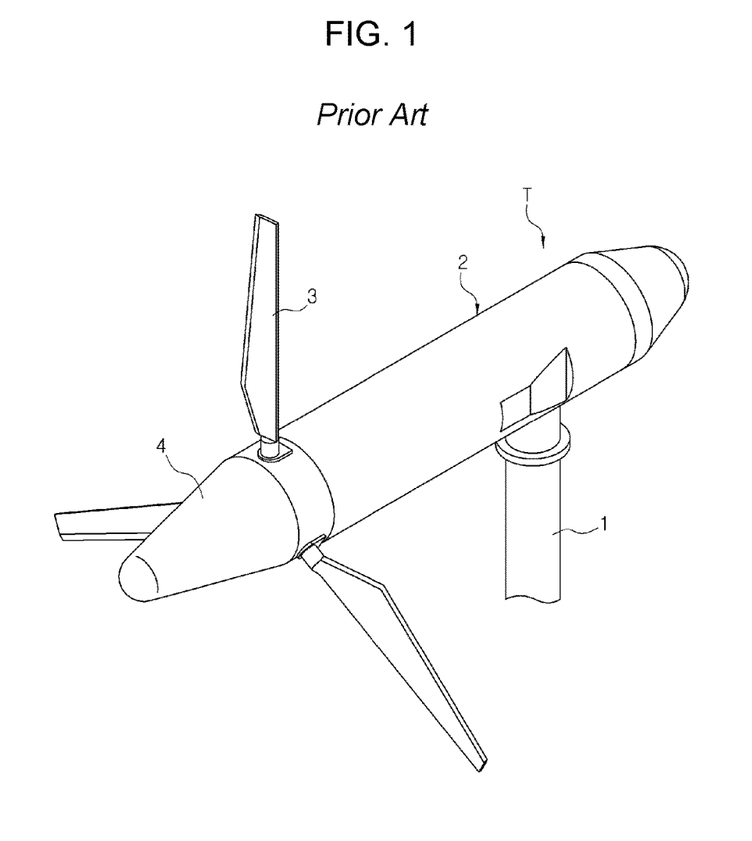
FIG. 1 is a perspective view of a wind turbine according to the related art.
Figure 2:
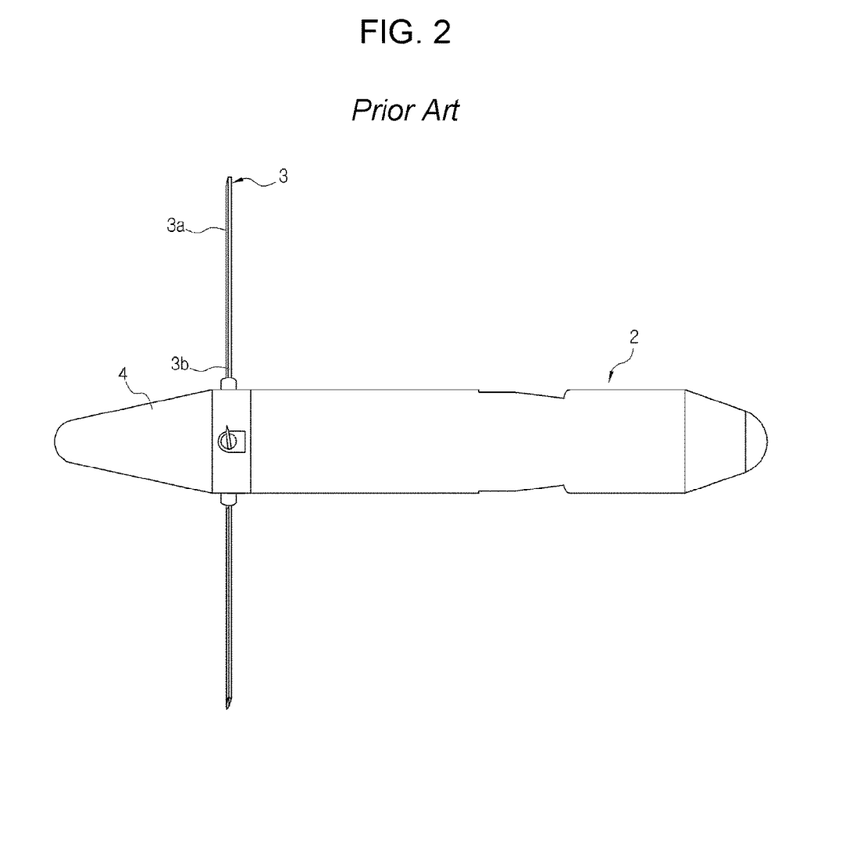
FIG. 2 is a plan view of the wind turbine according to the related art.

As illustrated in FIGS. 1 and 2, the wind turbine according to the related art is configured to rotatably mount a nacelle 2, which rotatably supports blades 3, at an upper end of a high-rise tower 1 standing on a ground and include the nacelle 2 having a step-up gearbox, a generator, and a control device (not illustrated) mounted therein so as to transfer a torque of a rotor blades 3 to a generator through a main shaft via a hub 4.

The wind turbine having the above configuration has decreasing aerodynamic performance due to a vortex that is generated at tips 3a of the blades 3 and a root 3b part. The decrease in aerodynamic performance of the blades 3 causes the decrease in a power coefficient of the wind turbine, and therefore there is a need to develop a technology of increasing the aerodynamic performance of the blades 3.

DISCLOSURE

Technical Problem

An object of the present invention is to provide a wind turbine having a nacelle fence capable of minimizing a vortex generated at downstream ends of blades by mounting a fence on the nacelle along an air flow direction.

Technical Solution

In one general aspect, a wind turbine having a nacelle fence including a tower standing on a ground, a nacelle mounted on an upper end of the tower, and rotor blades rotatably mounted on one side of the nacelle includes: at least one nacelle fence extending to an outer side of a circumferential surface of the nacelle along an air flow direction.

The nacelle fence may be formed to have a lateral section inclined by a certain angle with respect to a rotating shaft of the rotor blade and may be formed to have a lateral section inclined in an opposite direction with respect to a rotation direction of the blade, as it goes toward a fence downstream end from a fence upstream end.

The nacelle fence may be radially provided in plural based on a rotating shaft of the blade.

The nacelle fence may be formed so that an angle formed by a longitudinal section of a fence upstream end and the nacelle is vertical and an angle formed by a longitudinal section of the nacelle fence and the nacelle is gradually decreased as it goes toward a fence downstream end.

The nacelle fence may be formed to be spaced apart from the rotor blade at a certain distance in a downstream direction thereof and may be formed at an upstream side of the tower.

Advantageous Effects

According to the above configuration, the wind turbine having a nacelle fence may decrease the vortex generated at the downstream ends of the rotating blades, thereby improving the aerodynamic performance of the blades and increasing the power coefficient of the wind turbine.

DESCRIPTION OF DRAWINGS

The above and other objects, features and advantages of the present invention will become apparent from the following description of preferred embodiments given in conjunction with the accompanying drawings, in which.

BEST MODE

Hereinafter, exemplary embodiments of the present invention will be described in detail with reference to the accompanying drawings.

Figure 3:
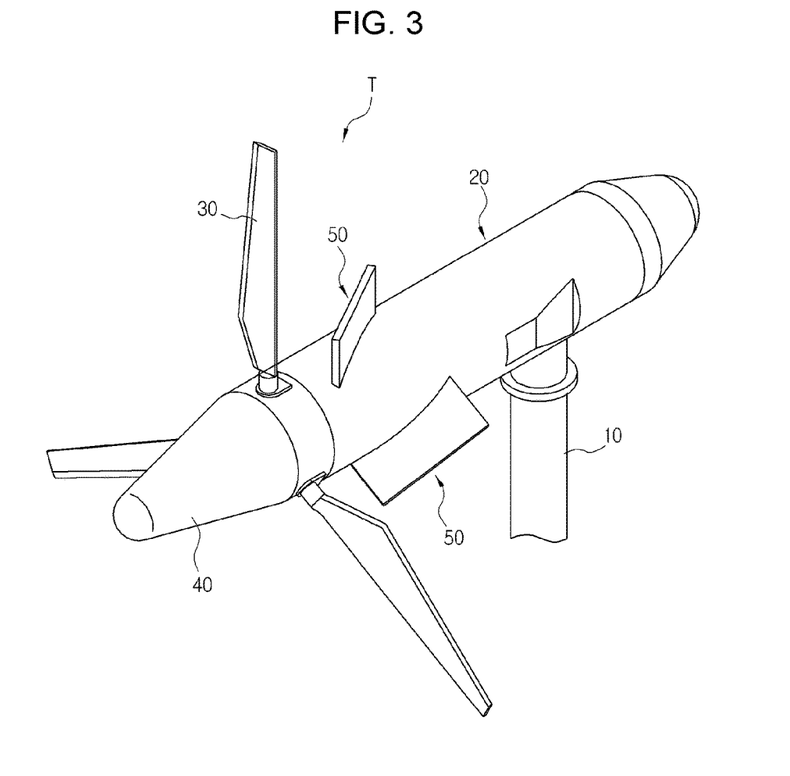
FIG. 3 is a perspective view of a wind turbine according to an exemplary embodiment of the present invention.
Figure 4:
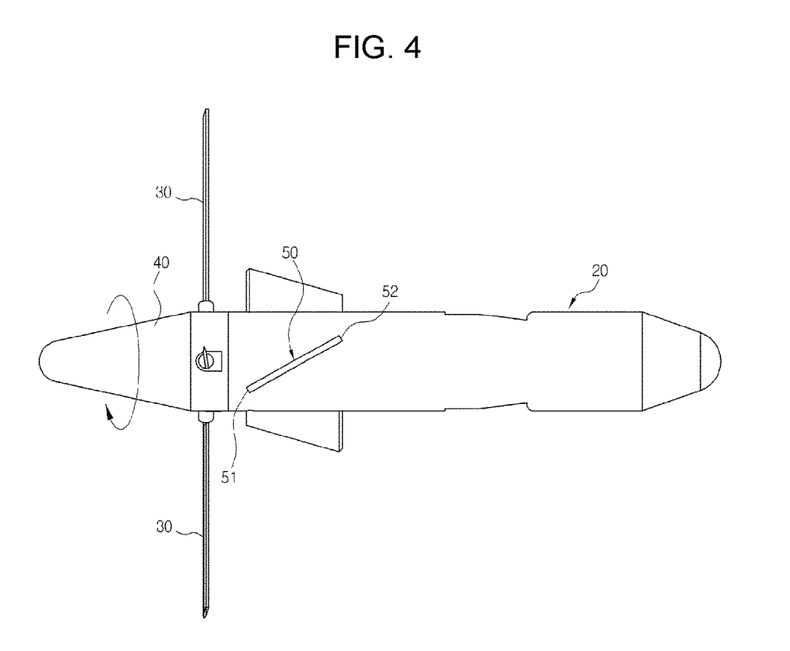
FIG. 4 is a plan view of the wind turbine according to the exemplary embodiment of the present invention.
Figure 5:
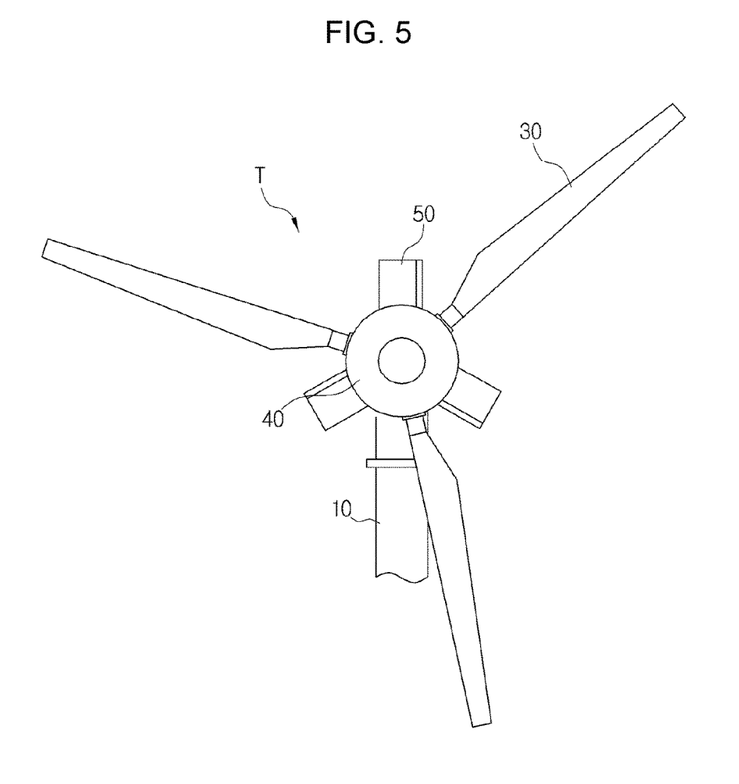
FIG. 5 is a front view of the wind turbine according to the exemplary embodiment of the present invention.

Referring to FIGS. 3 to 5, a wind turbine T having a nacelle fence according to an exemplary embodiment of the present invention is configured to include a tower 10, a nacelle 20, rotor blades 30, 40 and nacelle fences 50.

The tower 10 may be formed in a vertical length direction. A lower end of the tower 10 may be fixed to a ground and an upper end thereof may be provided with a rotating part (not illustrated). An upper surface of the rotating part may be coupled with a lower end of the nacelle 20. The rotating part serves to rotate the nacelle in a horizontal direction, that is, pitch-move the nacelle 20. As the configuration of the tower 10, a support of the wind turbine which is generally used may be used.

The nacelle 20 may be coupled with the upper end of the tower 10. The nacelle 20 is a body configuration of the wind turbine. The nacelle 20 may be hinge-coupled with the tower 10 to be able to rotate in a lateral direction so as to optimize positions of the rotor blades 30 in response to a wind direction. One side of the nacelle 20 may be rotatably coupled with the rotor blades 30, 40. An inside of the nacelle 20 may be provided with a step-up gearbox and a power generator. The nacelle 20 may be configured to transfer a torque of the rotor blades 30 to a power generator through a rotating shaft.

The rotor blades 30 may be configured to include a hub 40 which is connected to a rotating shaft of the nacelle 20 and blades 30 radially connected to each other based on the hub 40. A plurality of blades 30 may be coupled with the hub 40. Three blades 30 are illustrated in the drawings, but the number of blades is not limited to three and may be increased and decreased depending on capacity of a power generator and a usage of the wind turbine. As the rotor blades 30, rotor blades generally used in the wind turbine are applied and therefore the detailed description thereof will be omitted.

Hereinafter, a core configuration of the present invention, that is, nacelle fences 50 for improving aerodynamic performance of the rotor blades 30 by minimizing the vortex which may be generated at downstream sides of the rotor blades 30 by rotating the rotor blades 30 will be described in detail.

For convenience, an air inflow direction and an air outflow direction will each be described, defined as upstream and downstream.

The nacelle fence 50 is configured in a plate shape having a length. The nacelle fences 50 may be formed on a circumferential surface of the nacelle 20 to be integrally with the nacelle 20 or lower ends thereof may be coupled with a circumferential surface of the nacelle 20. The nacelle fences 50 may be formed on the nacelle 20 along an air flow direction. The nacelle fences 50 are formed to be spaced apart from the rotor blades 30 at a certain distance in a downstream direction. In this case, the spaced distance is differently determined depending on power generation capacity of the wind turbine, the number of blades, and a length of the blade. The plurality of nacelle fences 50 may be radially mounted on the nacelle 20 based on the rotating shaft but three nacelle fences 50 are illustrated in the drawings. However, the number of nacelle fences 50 is not limited to three and therefore may be increased and decreased depending on the capacity of the power generator and the usage of the wind turbine.

By the configuration of the nacelle fences 50 as described above, the vortex which may be generated at the downstream sides of the rotor blades 30 becomes a laminar flow and thus the vortex is minimized, thereby improving the aerodynamic performance of the rotor blades 30.

In this case, the nacelle fence 50 according to the exemplary embodiment of the present invention additionally has the following characteristic configurations to more effectively decrease the vortex.

As illustrated in FIG. 4, the nacelle fence 50 may be formed to have a lateral section inclined by a certain angle with respect to the rotor blade 30. That is, a line connecting between a fence upstream end 51 and a fence downstream end 52 of the nacelle fence 50 may be formed to be inclined by a certain angle with respect to the rotating shaft. A gradient of the nacelle fence 50 is differently determined depending on the power generation capacity of the wind turbine, the number of blades, and the length of the blade.

In particular, the nacelle fence 50 may be formed to be inclined in an opposite direction to a rotation direction of the rotor blade 30, as it goes toward the fence downstream end 52 from the fence upstream end 51. This is to stop forming a root vortex due to the rotation of the rotor blades 30. That is, the nacelle fence 50 may be formed to have a lateral section inclined by a certain angle in an opposite direction to the rotation direction of the rotor blade 30, as it goes toward the fence downstream end 52 from the fence upstream end 51 of the nacelle fence 50.

Figure 7:
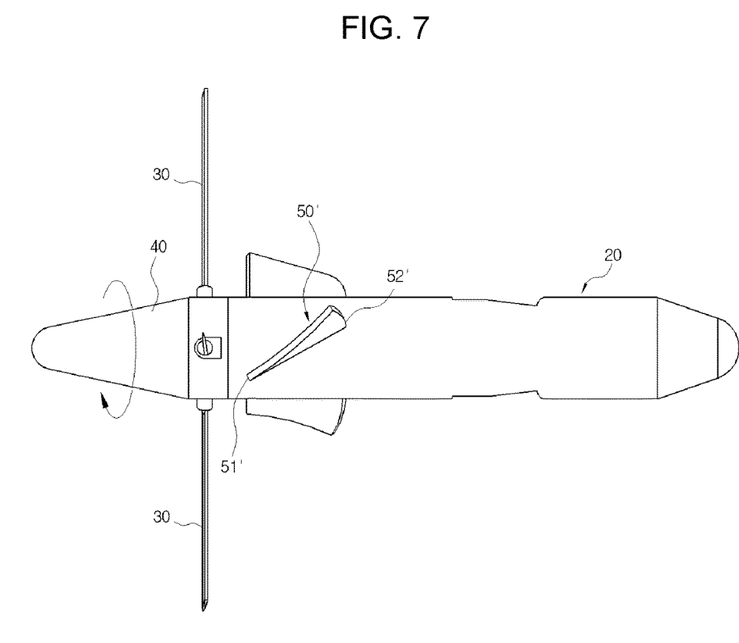
FIG. 7 is a plan view of the wind turbine according to another exemplary embodiment of the present invention.

Further, FIG. 7 shows another exemplary embodiment of the present invention. As shown in FIG. 7, a longitudinal section of the nacelle fence 50' has an angle vertical to the nacelle 20 at the fence upstream end 51' of the nacelle fence 50' but may be formed so that an angle with respect to the nacelle 20 is gradually decreased in an opposite direction to a rotation direction of the rotor blades 30, as it goes toward the fence downstream end 52'. As an example, when the angle formed by the fence upstream end 51' and the nacelle 20 is 90°, the angle with respect to the nacelle 20 may be 45° at the fence downstream end 52'.

Figure 6:
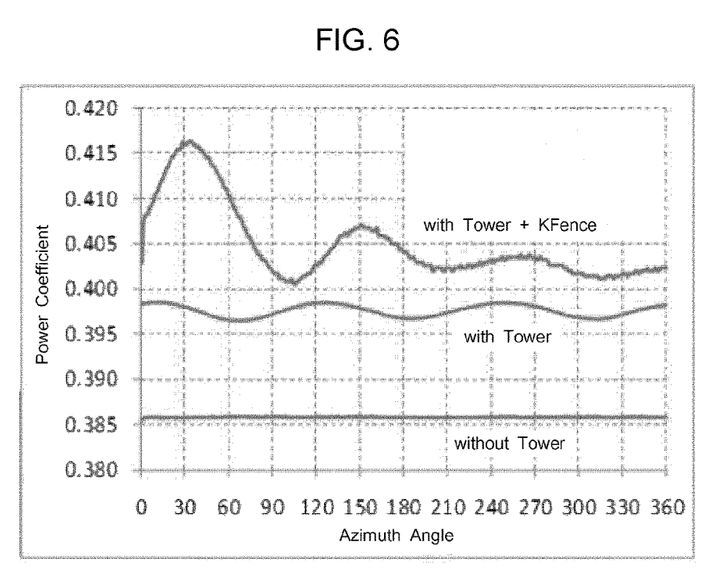
FIG. 6 is a diagram illustrating performance test graphs of the wind turbine according to the related art and the exemplary embodiment of the present invention.

FIG. 6 illustrates a performance test graph according to the wind turbine according to the exemplary embodiment of the present invention.

A horizontal axis of the illustrated graph represents an azimuth angle depending on the position of the blade 30. That is, the case in which the blade 30 is positioned at an upper side vertical to a ground of the hub 40 is defined as 0 and the case in which the blade 30 is positioned at a lower side vertical to the ground on the hub 40 is defined as 180.

A vertical axis of the illustrated graph represents a power coefficient. The power coefficient is calculated by dividing a power generation amount of the wind turbine.

Therefore, the power coefficient depending on the position of the blade 30 may be confirmed based on the graph illustrated in FIG. 6.

An experiment was performed by being divided into three groups of the wind turbine including the nacelle fence, a general wind turbine including a tower, and a wind turbine without a tower. A curve positioned at a top side represents a numerical curve of the wind turbine having a nacelle fence according to the exemplary embodiment of the present invention, a curve positioned at a middle represents a numerical curve of the general wind turbine with a tower, and a straight line positioned at a bottom side represents the numerical curve of the wind turbine without a tower.

As illustrated, the wind generator without the tower has a lowest power coefficient due to an influence of the blade vortex and the general wind turbine including the tower is a power coefficient higher than that of the wind turbine without the tower, since the tower decreases the vortex of the blade as much as a certain level.

Further, the wind turbine having nacelle fences according to the exemplary embodiments of the present invention minimizes the vortex of the blade using the nacelle fence and therefore has more excellent power coefficient than that of the remaining two wind turbines.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

The invention claimed is:

1. A wind turbine having a nacelle fence, the wind turbine comprising:
   a tower standing on a ground;
   a nacelle mounted on an upper end of the tower;
   rotor blades rotatably mounted on one side of the nacelle;
   at least one nacelle fence formed on an outer circumferential surface of the nacelle, the at least one nacelle fence being spaced apart from the rotor blades at a predetermined distance and extending toward the other side of the nacelle, wherein a longitudinal section of the at least one nacelle fence forms an angle with the nacelle, the angle is 90 degrees at a fence upstream end of the at least one nacelle fence, and the angle gradually decreases towards a fence downstream end of the at least one nacelle fence.

2. The wind turbine of claim 1, wherein the at least one nacelle fence is formed to have a lateral section inclined by a predetermined angle with respect to a rotating shaft of the rotor blades.

3. The wind turbine of claim 1, wherein the at least one nacelle fence is formed to have a lateral section inclined in an opposite direction with respect to a rotation direction of the rotor blades, as it goes toward the fence downstream end from the fence upstream end.

4. The wind turbine of claim 1, wherein the at least one nacelle fence includes two or more nacelle fences spaced apart from each other.

\* \* \* \* \*